(12) United States Patent
Griepentrog

(10) Patent No.: US 6,226,037 B1
(45) Date of Patent: May 1, 2001

(54) AKB INTERFACE CIRCUIT FOR KINE DRIVER IC

(75) Inventor: Dal Frank Griepentrog, Indianapolis, IN (US)

(73) Assignee: Thomson Licensing S.A., Boulgne Cedex (FR)

( * ) Notice: Subject to any disclaimer, the term of this patent is extended or adjusted under 35 U.S.C. 154(b) by 0 days.

(21) Appl. No.: 09/222,910

(22) Filed: Dec. 30, 1998

Related U.S. Application Data

(60) Provisional application No. 60/094,338, filed on Jul. 28, 1998.

(51) Int. Cl.[7] .............................. H04N 5/68; H04N 5/52; H04N 5/18; H04N 5/16; G09G 1/04
(52) U.S. Cl. .................. 348/379; 348/379; 348/380; 348/678; 348/691; 348/695; 348/696-7; 315/381; 315/382; 315/383; 315/388; 315/370
(58) Field of Search .................... 348/379, 380, 348/678, 691, 695, 696, 697; 358/65, 242; 315/381, 382, 383, 370, 388

(56) References Cited

U.S. PATENT DOCUMENTS

| | | | |
|---|---|---|---|
| 4,450,476 | * 5/1984 | Tallant, II | 358/74 |
| 4,482,921 | * 11/1984 | Filliman | 358/243 |
| 4,484,229 | * 11/1984 | Parker | 358/243 |
| 4,502,073 | * 2/1985 | Hinn et al. | 358/10 |
| 4,518,986 | * 5/1985 | Hinn et al. | 358/65 |
| 4,554,578 | * 11/1985 | Willis | 358/65 |
| 4,599,642 | * 7/1986 | Willis | 358/65 |
| 4,677,491 | * 6/1987 | Hinn et al. | 358/242 |
| 4,694,350 | * 9/1987 | Hinn et al. | 358/242 |
| 5,835,161 | * 11/1998 | Keller | 348/674 |
| 5,894,327 | * 4/1999 | Griepentrog | 348/379 |
| 5,994,841 | * 11/1999 | Allen et al. | 315/1 |

\* cited by examiner

Primary Examiner—Reinhard Eisenzopf
Assistant Examiner—Paulos Natnael
(74) Attorney, Agent, or Firm—Joseph S. Tripoli; Robert D. Shedd

(57) ABSTRACT

An AKB interface apparatus in a display system (10), includes a video signal processing IC (12) having outputs coupled via respective kinescope driver ICs (18,20,22) to respective kinescope cathodes (K1,K2,K3) for display of a color image, the signal processing IC having an input 27 for receiving an AKB input signal, the driver ICs having respective outputs (28,30,32) providing respective cathode current indicating signals (RP,GP,BP) An interface circuit (100) couples the cathode current indicating signals to the AKB input of the signal processing IC. The interface circuit comprises a load circuit (110) for generating a load voltage (Vo) in response to at least one of the cathode current indicating signals. A leakage correction circuit (130), responsive to said load voltage (Vo), feeds back a leakage correction current (Io) to the load circuit. The leakage correction circuit includes a keyed comparator (Q5,Q6,Q7) for comparing the output voltage of the load (110) with a reference potential during a vertical retrace pulse interval to provide a leakage indicating signal; and a controllable current source (Q1,Q3) is coupled to the keyed comparator and responsive to the leakage indicating signal for feeding back the leakage correction current (Io) to the load circuit (110). In one application the cathode current indicating signals are first combined (110) and then subjected to leakage compensation (130) for application to the processing IC AKB input. In another application, the cathode current indicating signals are individually leakage compensated and then combined (300) for application to the processing IC.

5 Claims, 3 Drawing Sheets

AKB INTERFACE CIRCUIT FOR KINE DRIVER IC

RELATED APPLICATIONS

This application claims the benefit of U.S. Provisional Application Ser. No. 60/094,338 filed Jul. 28, 1998.

FIELD OF THE INVENTION

This invention relates to interface circuits for conditioning output signals of one or more integrated circuits (IC) for application to other circuits. The invention has particular application in display systems for interfacing signals provided by one or more kinescope driver integrated circuits for application to video signal processing circuits.

BACKGROUND OF THE INVENTION

In conventional television receiver/monitor applications a video signal may be displayed is processed for display by a signal processing integrated circuit and coupled to the cathodes of a kinescope by means of respective kinescope driver integrated circuit. For AKB (automatic kinescope bias) operation, the driver amplifiers may include cathode current sensing circuits for supplying cathode current indicating pulses back to an AKB input of the signal processing IC.

In certain applications, the output signals produced by the driver ICs may not be directly compatible with the particular signal processing IC and may require interface circuitry to properly condition and couple the current indicating signals from the driver ICs to the processing IC. An example of such an arrangement, described in detail hereinafter, employs a signal processing IC such as the Toshiba type TA1276N or the Philips type TDA4780 ICs and driver ICs such as the type TDA6120Q IC manufactured by Philips.

SUMMARY OF THE INVENTION

The present invention resides, in part, in the discovery that when interfacing processing and driver ICs, it would be particularly desirable to provide circuitry for correction kinescope leakaqe currents. It is an object of the present invention to provide an AKB interface circuit for conditioning AKB related output signals of one or more kinescope driver integrated circuits for application to a video signal processing integrated circuit and for additionally providing correction for kinescope leakage currents when interfacing the ICs.

Display apparatus in accordance with the invention comprises a video signal processing IC (12) having outputs coupled via respective kinescope driver ICs (18,20,22) to respective kinescope cathodes (K1,K2,K3) for display of a color image, said signal processing IC having an input 27 for receiving an AKB input signal, the driver ICs having respective outputs (28,30,32) providing respective cathode current indicating signals (RP,GP,BP). An interface circuit (100) is provided, for coupling the cathode current indicating signals to the AKB input of the signal processing IC. The interface circuit (100) comprises a load circuit (110) for generating a load voltage (Vo) in response to at least one of the cathode current indicating signals. A leakage correction circuit (130) is responsive to the load voltage (Vo) for applying a leakage correction current (Io) to the load circuit. The correction circuit comprises a keyed comparator (Q5,Q6,Q7) for comparing the output voltage of the load (110) with a reference potential during a vertical retrace pulse interval to provide a leakage indicating signal; and a controllable current source (Q1,Q3) is coupled to the keyed comparator and responsive to the leakage indicating signal for feeding back a leakage correction current to said load circuit (110).

In a desirable application of the principles of the invention, the cathode current indicating signals are first combined and then subjected to leakage compensation for application to the processing IC AKB input.

In another application of the principles of the invention, the cathode current indicating signals are individually leakage compensated and then combined for application to the processing IC.

BRIEF DESCRIPTION OF THE DRAWING

The foregoing and other features of the invention are illustrated in the accompanying drawing, wherein like elements are denoted by like reference designators, and in which.

DETAILED DESCRIPTION

Figure 1:
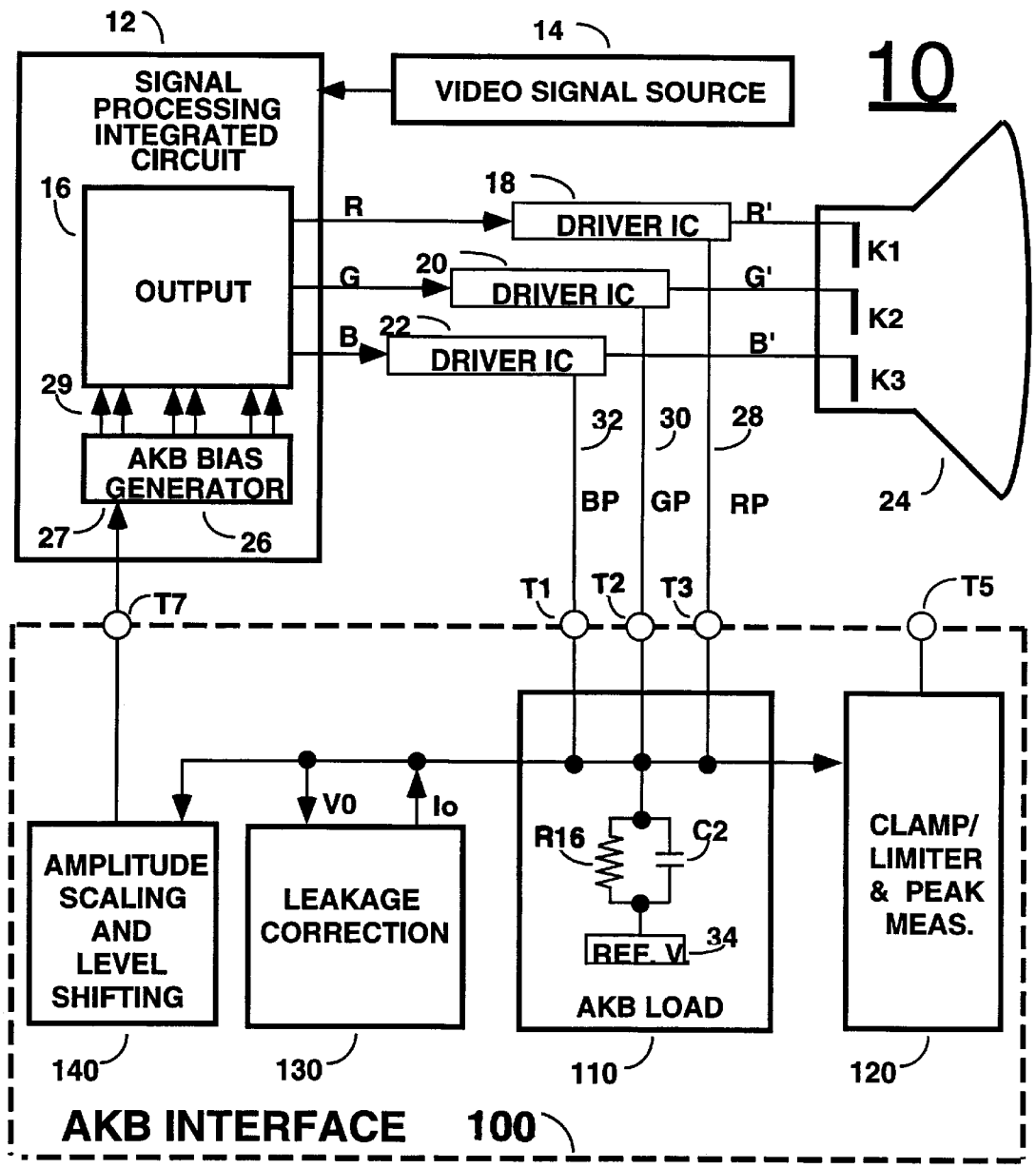
FIG. 1 is a block diagram of television apparatus embodying the invention.

The television receiver/monitor 10 of FIG. 1 includes a signal processing integrated circuit 12 (herein after, "IC"), such as the Toshiba type TA1276N IC or the Philips type TDA4780 IC, which is coupled to a video signal source 14 for receiving a video signal for display and produces R, G, and B color signals in respective stages of an output section 16. The R, G and B signals are coupled to respective kinescope driver amplifiers 18, 20 and 22 which may comprise, for example, type TDA6120Q integrated circuits manufactured by Phillips. The amplified R, G, and B output signals of the driver ICs are coupled to respective cathodes K1, K2 and K3 of a kinescope 24. The signal processing IC 12 includes an AKB section(26) coupled to the output section 16 which produces AKB test voltage pulses at respective ones of the R, G and B outputs of the signal processing IC 12 during successive horizontal lines within or near the vertical blanking interval.

The timing for the AKB test pulses may be different depending on the operating mode of the receiver/monitor 10. For example, for NTSC operation, the AKB test pulses occur during lines 19, 20 and 21 for the R, G and B signals, respectively. For a computer VGA mode, the pulses may start about one line after the end of the vertical blanking interval, or within the beginning of the picture interval. Also, the duration of the vertical blanking interval is different for the different modes.

Normal video information is blanked during the generation of the AKB test pulses. The AKB test voltage pulses cause respective AKB measurement current pulses (RP, BP and GP) to be produced at respective cathode current sense outputs 28, 30 and 32 of the kinescope driver amplifiers 18, 20 and 22, respectively. The measurement current pulses correspond to respective cathode currents for cathodes K1, K2 and K3. The measurement current pulses occur in succession (i.e., one after another) and are coupled to respective input terminals T1, T2 and T3 of an AKB load 110 in interface 100 where they are converted to AKB measurement voltage pulses by means of a common load resistor R16 in load 110 that is connected at one end thereof to terminals T1, T2 and T3 and at the other end thereof to a source of reference voltage 34. A filter capacitor C2 is coupled across the load resistor R16. The AKB measurement voltage pulses produced across load resistor R16 are coupled via the AKB interface circuit 100 to an input 27 of the AKB section of signal processing IC 12. The AKB section 26 compares the successively developed AKB measurement voltage pulses to a reference voltage and in response to the comparison develops bias voltages at outputs 29 for the R, G and B stages of the output section 16.

For ease of illustration and discussion, the AKB interface 100 is illustrated in FIG. 1 in simplified block form comprising a load 110, a leakage correction circuit 130, and amplitude scaling and level shifting circuit 140 and a clamp/limiter and peak measurement circuit 120. The structure and function of each of these blocks is shown and described later in the discussion of the schematic diagram of FIG. 2.

While the interface circuit 100 is described below in terms of an AKB application, it is noted that such a circuit may be useful in conjunction with an automatic white level or gain (drive) arrangement since automatic gain adjustment arrangements also measure cathode currents which are generated in response to test voltage pulses during an operation similar to that of the AKB operation. Such automatic gain adjustment arrangements are often included in the same signal processing IC as an AKB arrangement and typically utilize the same cathode current sensing and measurement pulse load circuits. The Philips TDA4680 signal processing IC includes both AKB and automatic drive adjustment provisions.

The AKB interface circuit 100 shown in FIG. 2 will now be described in detail. It will be noted that the interface circuit 100 is the subject matter of U.S. Provisional Application Serial No. 60/094,338 filed Jul. 7 1998.

By way of background regarding the interface circuit 100, digital, including high definition television receivers and computer or multimedia monitors require relatively wide bandwidth kinescope drivers. For example, the monitor/receiver 10 of FIG. 1 includes Philips type TDA6120Q kinescope drivers ICs 18, 20 and 22 (three are used, one for each of the R, G and B signals) because of the IC's relatively wide large-signal bandwidth. However, it has been found that a kinescope driver IC, such as the Philips TDA6120Q, may be difficult to interface with the AKB section of a conventional video signal processing IC, such as the Toshiba TA1276N or Philips TDA4780, because of the characteristics and restrictions of the current measurement output of the kinescope driver IC. Philips Application Note AN96073 for the TDA6120Q kinescope driver IC sets forth certain characteristics and/or restrictions. Of these, the following are significant:

(i) The nominal offset current of the IC is 20 $\mu A$. Unfortunately, the nominal offset current is high considering that the desired picture tube cut-off current is less than 20 $\mu A$; and (ii) The possible range in offset current can be from −40 $\mu A$ to +120 $\mu A$. This becomes a very high value for three amplifiers in parallel as illustrated. However, this offset current is constant, and if the dynamic range of the AKB arrangement (referred to in the aforementioned Application Note as "Automatic Black-current Stabilization or ABS arrangement) is large enough, this offset current will be seen as a large leakage current. If the offset current can be stabilized, the ABS (or AKB) loop will work satisfactorily.

(iii) The current measurement output of the TDA6120Q is reliable only if the voltage at which the current is measured is between 4 and 20 volts. The Toshiba TA1276N, the Philips TDA4780 and known similar video processing ICs are designed to receive a lower voltage level at the AKB inputs thereof.

As a brief overview of the interface circuit 100, the overall leakage current of the three summed AKB current sense outputs 28, 30 and 32 of the three TDA6120Q kinescope driver ICs 18, 20 and 22 (which are connected at terminals T1, T2 and T3 of the load 110) is compensated kinescope leakage currents by means of the leakage correction circuit 130 which receives the output voltage Vo of load 110 and supplies a leakage correction current Io back to the load 110. This feedback circuit is a form of servo mechanism and comprises a keyed comparator (Q5, Q6 and Q7) which receives the load voltage, Vo, compares it with a reference level during vertical retrace and controls a differential current source (Q1, Q3) comprised of a fixed current source Q1 and a variable current source Q3 which feeds back a net leakage correction current Io to the load circuit 110. By this means leakage current are corrected which enables a DC level translation and scaling to be made between the kinescope driver ICs and the signal processing IC.

The DC level translation and scaling functions are provided by amplitude scaling and level shifting circuit 140. This circuit provides an acceptable DC signal level match between the kinescope driver IC's and the video processor IC by shifting the DC level of the load voltage and scaling the amplitude of the load voltage appropriately. The DC level shift is provided by transistor Q4 in a reference voltage source which applies a 3.0 voltage reference to the load circuit 110 and the scaling is provided by a pair of transistors Q8 and Q9 which sense the voltage across load 110 and generate in a load resistor R20 a scaled version of the load voltage which is coupled via an emitter follower Q10 to the input 27 of the AKB section 26 of IC 12.

Advantageously, the AKB interface circuit 100 makes it possible to utilize signal processing ICs, such as the Toshiba TA1276N or the Philips TDA4780 with kinescope driver ICs, such as the Philips type TDA6120Q.

An embodiment of the AKB interface circuit is described below, by way of example, with reference to the Toshiba TA1276N video processing IC and the Philips TDA6120Q kinescope driver IC. The TA1276N signal processing IC expects the nominal AKB pulse amplitude to be 1.6 volts. The AKB interface circuit detects the AKB sense pulses at a level ranging from 4.8 to 5.6 volts. That voltage range is within the accurate measurement output range of the Philips TDA6120Q kinescope driver IC. The reference level for the pulses (+4.8 VDC) is maintained by a keyed servo-mechanism (i.e., a feedback regulator) that compares the signal from the kinescope ICs to a 4.8 VDC reference and modifies bias on a current source to maintain that nominal voltage level, independent of the offset current which can range from −120 $\mu A$ to +360 $\mu A$ for the three driver ICs. A DC level shift and scaling circuit is used to translate the pulses at the 4.8 to 5.6 volt level to a 0.8 to 1.6 volt level. The AKB arrangement in the TA1276N will adjust the R, G and B bias voltages to maintain the AKB measurement pulses at a nominal level of 1.6 volts.

Figure 2:
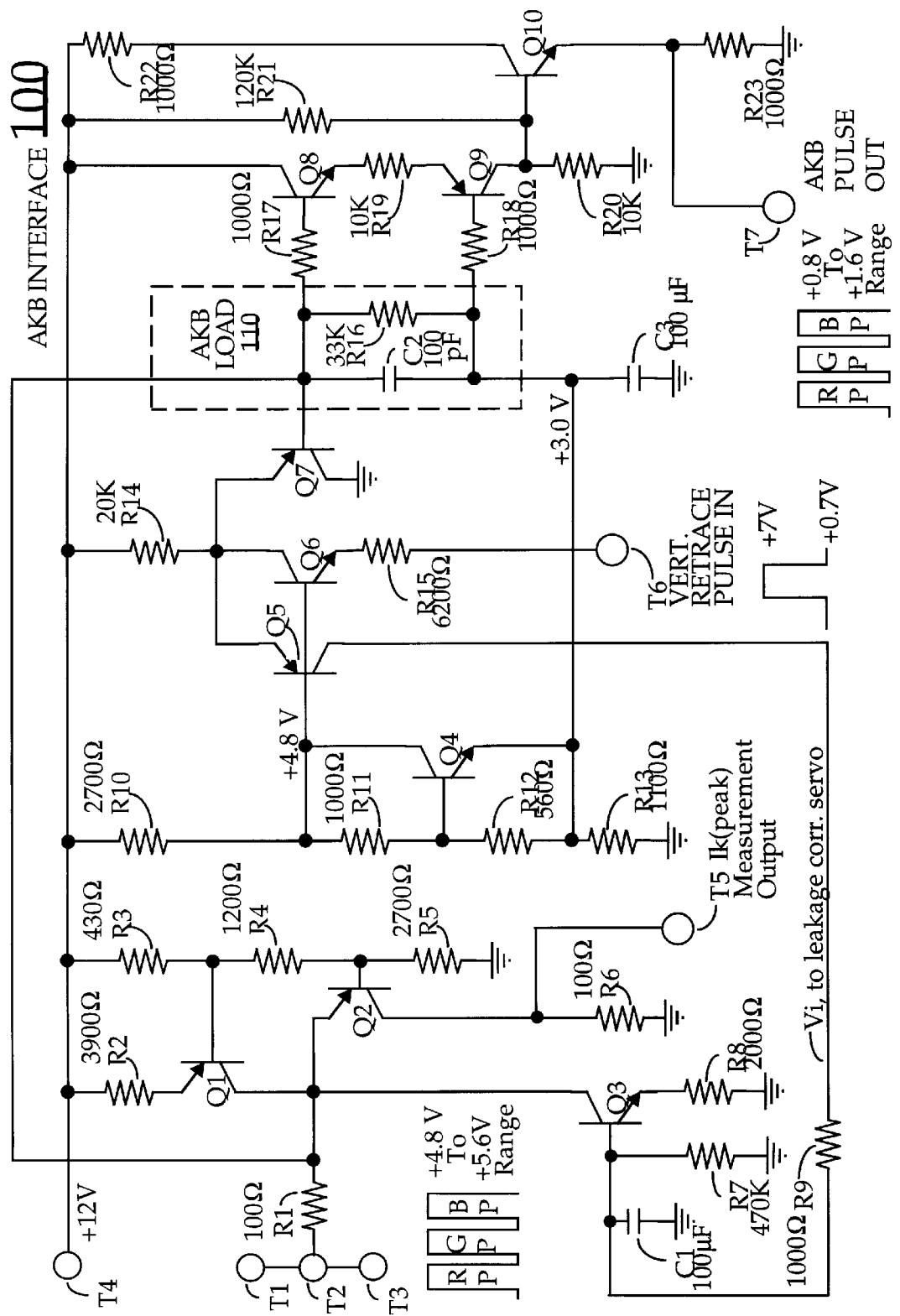
FIG. 2 is a detailed circuit diagram of an AKB interface circuit used in the apparatus of FIG. 1 and embodying the invention.

Considering now further details of the interface circuit 100 in FIG. 2, the current measurement pulses RP, GP and BP applied to the commonly connected input terminals T1, T2 and T3 are summed and applied via a relatively small surge current limiting resistor R1 to AKB load 110 which produces a load voltage Vo across the load resistor R16 of load 110. The load voltage Vo is applied to a leakage correction circuit (130 in FIG. 1) or "servo-mechanism" comprising transistors Q1, Q3, Q5, Q6 and Q7 in FIG. 2. The transistors Q5–Q7 form a keyed comparator which compares the load voltage Vo with a fixed reference voltage (+4.8V) provided by a reference voltage circuit comprising transistor Q4 (described below). The keyed comparator is formed by coupling the emitters of Q5 and Q7 and the collector of Q6 to a supply terminal T4, coupling the base of Q5 to a reference voltage source (+4.8v), coupling the base of Q7 to the output of load 110 and applying keying pulses during vertical retrace via resistor R15 to the emitter of Q6. The keying pulses at terminal T6 may be provided by suitable deflection timing circuits or the IC 12. The collector or Q7 is grounded and the comparator output is taken from the collector of Q5. In operation, the keyed comparator maintains the detection reference at 4.8 volts by modifying the pull down current source bias (Q3) during the vertical retrace period when there is no signal on the current sense connection from the kinescope driver ICs. Transistor Q6 is saturated preventing conduction of Q5 and Q7 except during the vertical keying pulse. Capacitor C1 is charged by collector current from Q5 and discharged by resistor R7. The bias for the variable current source transistor Q3 is essentially constant or changes very slowly because capacitor C1 is relatively large and the charge and discharge currents for C1 are relatively small. Thus, there are no abrupt changes in the Q3 current due to operation of the keyed comparator Q5–Q7.

The keyed comparator output (collector of Q5) is coupled to a variable current source Q3 and a smoothing or integrating capacitor C1 which produces a smoothed variable output current that is summed with a fixed output current provided by a fixed current source Q1. The fixed current source Q1 is coupled at the emitter thereof to supply terminal T4 and receives base bias from a potential divider comprising resistors R3–R5. The variable current source comprises transistor Q3 having an emitter resistor R8 coupled to ground and a base coupled to ground via a smoothing capacitor C1 and a resistor R7 for providing a discharge path for the capacitor C1 and thus sets the capacitor discharge time constant. The input to the variable current source is provided by a resistor R9 that couples the output (collector Q5) of the keyed current source to the base of the variable current source Q3 and the integrating or smoothing capacitor C1.

The difference of the two currents provided by the fixed current source Q1 and the variable current source Q3, Io, is fed back to the load circuit for correcting leakage currents. If, for example, the kinescope leakage currents tend to increase, the keyed comparator increases the charge on capacitor C1 thereby increasing the current conducted by transistor Q3. Since this current is subtracted from that provided by the fixed current source Q1, the net output current Io to load 110 will decrease thus tending to reduce and stabilize the load voltage at the reference voltage level of +4.8 volts provided by the collector of a reference voltage transistor Q4. Conversely, if leakage currents decrease, the load voltage will tend to decrease also and the keyed comparator Q5–Q7 will decrease the current provided by the variable current source Q3. As a result, the difference between the variable current source Q3 and the fixed current source Q1 will increase thus sending an increasing net output current Io to load 110 thus counteracting the decreased leakage current and stabilizing the load voltage at the reference level of 4.8 volts provided by the reference voltage supply transistor Q4. It will be noted that, in this example of the invention, the pull-up current source Q1 needs to provides about 135 $\mu$A. The value needs to be at least 120 $\mu$A, the maximum negative offset current for the three kinescope drivers used in the illustrated embodiment of the invention. As to the pull-down current source Q3, the output current should be variable over a range of, illustratively, 0–500 mA. The value needs to be at least 360 $\mu$A, positive offset current plus the 135 $\mu$A of the pull-up current source Q1.

A further feature of interface 100 includes the clamp/limiter and peak measurement circuit 120 of FIG. 1. In FIG. 2 this comprises a voltage clamp transistor Q2 that prevents the input signal (Vo across load 110) from exceeding +8.2 volts as the beam current increases to maximum during trace intervals. This is implemented by connecting the emitter of PNP transistor Q2 to the load 110, coupling the collector there to an output terminal T5 and to ground via a load resistor R6 and biasing the base of transistor by a potential divider comprising resistors R3–R5 connected between the supply terminal T4 and ground. The common connection of resistors R3 and R4 provides bias for the base of the fixed current source transistor Q1 and the common connection of resistors R4 and R5 provides bias for the base of the limiter or clamp transistor Q2. The load resistor R6 and output terminal T5, provide an output voltage when the clamp or limiting transistor Q2 turns on due to excessive load voltage. Although not used in this example of the invention, this output may be used for providing peak beam current limiting, if desired, as described later.

Level shifting and scaling of the load voltage developed across load resistor R16 (circuit 140 in FIG. 1) is provided by transistors Q8 and Q9 in FIG. 2 which are coupled together at the emitters thereof by resistor R19 and coupled at the bases thereof to the load 110 via respective base coupling resistors R17 and R18. This generates a collector current for Q9 across resistor R20 proportional to the current through load resistor R16. Resistor R21 is a pull up resistor coupled to the base of Q10 and to R20 to shift the pulse reference from 0 volts to +0.8 volts. This reduces the pulse amplitude requirement from the interface circuit to 0.8 volts peak to peak since the TA1276N signal processing IC is designed to receive a nominal level of 1.6 volts relative to ground.

DC reference voltages of +3.0 volts for the load 110 and of +4.8 volts for the reference input (base of Q5) of the keyed comparator Q5–Q7 are provided by transistor Q4 connected in a "Vbe multiplier" configuration. Specifically, Q4 is coupled via collector and emitter resistors R10 and R13 to the supply terminal T4 and ground, respectively, and a potential divider comprising resistors R11 and R12 is coupled to apply the collector-emitter voltage of Q4 to its base. Resistors R11 and R12 feed back about one-third of the collector emitter voltage to Q4 and so the net collector emitter voltage is regulated at about three times the base-emitter threshold voltage (i.e., 3Vbe) of Q4) which equals about 1.8 volts (i.e., 3 times 0.6 volts Vbe). The emitter voltage of Q4 is elevated or shifted to +3.0 volts by means of Resistors R10 coupling the supply voltage (+12V) to the collector and R13 coupling the emitter to ground. A feature of this reference voltage supply is that variations in the Vbe thereof provides temperature compensation for variations in the Vbe of transistors Q8, Q9 and Q10.

As previously mentioned, resistor R6 coupled to output terminal T5 provides a measure of peak cathode current when transistor Q2 is limiting or clamping to load voltage to about +8 volts. This may be used for peak beam current limiting, if desired. Peak beam currents will be large compared to cathode cut-off current and will develop a voltage across R6 equal to the current times the resistance, that is, 6 mA of cathode current would produce 0.6 volt at output T5 when R6 is 100 Ohms. This developed voltage can be used to limit the kinescope driver signal such that peak cathode current can not increase above a particular level. For that purpose the voltage developed across resistor R6 could be coupled to the contrast control section of the signal processing IC, for example or to some other suitable point such as the kinescope driver amplifiers. The peak beam current limiting function is particularly useful in projection display systems.

Figure 3:
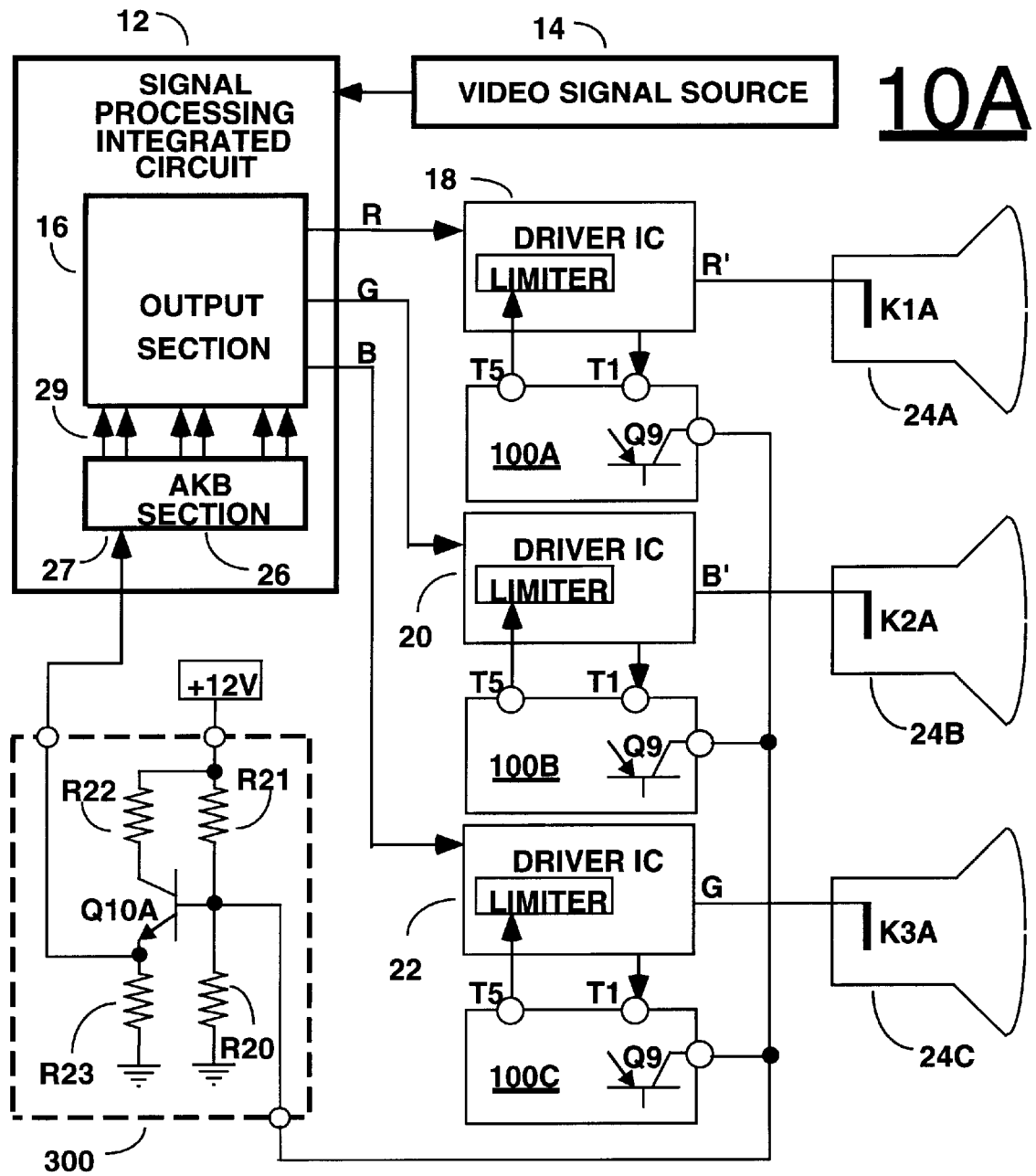
FIG. 3 is a block diagram, partially in schematic form, illustrating a modification of the apparatus of FIG. 1.

In a projection display system, three separate kinescopes 24A, 24B and 24C are utilized. In that case, a separate AKB interface circuit (100A, 100B and 100C), such as that described above, can be provided for each of the three kinescope drive ICs 18, 20 and 22 associated with respective ones of the three separate kinescopes K1A, K2A and K3A. This is illustrated in FIG. 3 wherein respective interface circuits 100A, 100B and 100C are coupled to respective ones of the kinescope driver amplifier. The three AKB interface circuits can be located together with respective kinescope drive ICs on respective kinescope drive boards mounted on respective kinescope socket connectors. In such an arrangement, the transistors corresponding to transistor Q9 would be part of respective AKB interface circuits located on respective kinescope driver boards and the buffer transistor Q10 and associated bias resistors would be located on a fourth board (300 in FIG. 3) and coupled to receive respective ones of the collector currents from Q9 of each of the three kinescope drive boards. Operation is essentially the same as previously described except that each individual projection kinescope cathode K1A, K2A and K3A is individually leakage current corrected.

What is claimed is:

1. An AKB interface apparatus in a display system, comprising:
    a video signal processing IC having outputs coupled via respective kinescope driver ICs to respective kinescope cathodes for display of a color image, said signal processing IC having an input for receiving an AKB input signal, said driver ICs having respective outputs providing respective cathode current indicating signals; and an interface circuit, for coupling said cathode current indicating signals to the AKB input of said signal processing IC, said interface circuit comprising:
    a load circuit for generating a load voltage in response to at least one of said cathode current indicating signals;
    a leakage correction circuit responsive to said load voltage for applying a leakage correction current to said load circuit;
    said leakage correction circuit comprising a keyed comparator for comparing said output voltage of said load with a reference potential during a vertical retrace pulse interval to provide a leakage indicating signal;
    a controllable current source coupled to said keyed comparator and responsive to said leakage indicating signal for feeding back a leakage correction current to said load circuit; and filter means for coupling said leakage indicating signal to said controllable current source and for smoothing said leakage indicating signal.

2. Apparatus as recited in claim 1 wherein said controllable current source comprises:
    a fixed current source for supplying a fixed current of a first sense to said load circuit;
    a variable current source for supplying a variable current of opposite sense to said load circuit, said variable current source having a control input coupled to receive said leakage indicating signal from said keyed comparator.

3. Apparatus as recited in claim 1 further comprising:
    an amplitude scaling and level shifting circuit responsive to said load voltage for shifting the amplitude and the DC level thereof for application to said AKB input of said video signal processing IC.

4. Apparatus as recited in claim 1 wherein:
    said load circuit includes circuit means for initially combining said cathode current indicating signals for forming said load voltage prior to leakage correction of said load voltage for application to said video signal processing IC.

5. Apparatus as recited in claim 1, wherein:
    said each said cathode current indicating signal is applied to a respective separate load circuit coupled to respective separate leakage correction circuit, each having an output providing a respective leakage corrected cathode current indicating signal and further comprising:
    means for combining said leakage corrected output currents of each respective load circuit for generating said AKB control voltage for application to said AKB input of said signal processing IC.

* * * * *